United States Patent
Kim et al.

(10) Patent No.: US 8,927,153 B2
(45) Date of Patent: Jan. 6, 2015

(54) CATHODE ACTIVE MATERIAL FOR LITHIUM SECONDARY BATTERIES WITH CORE OF LITHIUM METAL OXIDE AND SHELL OF LITHIUM IRON PHOSPHATE OXIDE, METHOD OF PREPARING THE SAME, AND LITHIUM SECONDARY BATTERIES COMPRISING THE SAME

(75) Inventors: Seong-Bae Kim, Incheon (KR); Woo-Seong Kim, Gyeonggi-do (KR); Ji-Jun Hong, Seoul (KR); Sung-Tae Koh, Chungcheongnam-do (KR); Yoon-Jeong Heo, Chungcheongnam-do (KR)

(73) Assignees: Daejung Em Co., Ltd., Incheon (KR); Kokam Co., Ltd., Siheung (KR)

( * ) Notice: Subject to any disclaimer, the term of this patent is extended or adjusted under 35 U.S.C. 154(b) by 110 days.

(21) Appl. No.: 12/528,133

(22) PCT Filed: Oct. 31, 2007

(86) PCT No.: PCT/KR2007/005430
§ 371 (c)(1),
(2), (4) Date: Aug. 21, 2009

(87) PCT Pub. No.: WO2009/057834
PCT Pub. Date: May 7, 2009

(65) Prior Publication Data
US 2010/0203388 A1 Aug. 12, 2010

(30) Foreign Application Priority Data
Oct. 29, 2007 (KR) .................. 10-2007-0109034

(51) Int. Cl.
*H01M 4/131* (2010.01)
*H01M 4/136* (2010.01)
(Continued)

(52) U.S. Cl.
CPC ............ *H01M 4/5825* (2013.01); *H01M 4/505* (2013.01); *H01M 4/525* (2013.01); *H01M 10/0525* (2013.01); *H01M 4/62* (2013.01); *H01M 4/366* (2013.01); *Y02E 60/122* (2013.01); *H01M 4/364* (2013.01)
USPC ........ 429/231.3; 429/221; 429/223; 429/231.1

(58) Field of Classification Search
USPC ............................ 429/223, 221, 231.1, 231.3
See application file for complete search history.

(56) References Cited

U.S. PATENT DOCUMENTS

| 6,984,469 | B2 * | 1/2006 | Kweon et al. | 429/231.95 |
| 2004/0096743 | A1 * | 5/2004 | Okae et al. | 429/231.1 |

(Continued)

FOREIGN PATENT DOCUMENTS

| JP | 2001-143705 A | 5/2001 |
| JP | 2002-075368 A | 3/2002 |

(Continued)

OTHER PUBLICATIONS

Yamaura, K., Human translation of JP 2002-075368 A, Mar. 2002.*

(Continued)

*Primary Examiner* — Sean P Cullen
(74) *Attorney, Agent, or Firm* — Mintz Levin Cohn Ferris Glovsky and Popeo, P.C.; Kongsik Kim

(57) ABSTRACT

The present invention relates to a cathode active material for lithium secondary batteries with high safety, a method of preparing the same and lithium secondary batteries comprising the same. The cathode active material of the present invention comprises a lithium metal oxide secondary particle core portion formed by aggregation of lithium metal oxide primary particles; and a shell portion formed by coating the secondary particle core portion with an olivine-structured lithium iron phosphate oxide. The cathode active material of the present invention allows to manufacture lithium secondary batteries with improved safety, especially overcharge characteristics.

12 Claims, 14 Drawing Sheets

(51) Int. Cl.
  *H01M 4/1391* (2010.01)
  *H01M 4/1397* (2010.01)
  *H01M 4/525* (2010.01)
  *H01M 4/58* (2010.01)
  *H01M 10/0525* (2010.01)
  *H01M 4/505* (2010.01)
  *H01M 4/62* (2006.01)
  *H01M 4/36* (2006.01)

(56) References Cited

U.S. PATENT DOCUMENTS

| | | | |
|---|---|---|---|
| 2004/0201948 A1 | 10/2004 | Hosoya et al. | |
| 2004/0253518 A1 | 12/2004 | Hosoya et al. | |
| 2004/0258836 A1* | 12/2004 | Besenhard et al. | 427/180 |
| 2005/0181279 A1 | 8/2005 | Hosoya | |

FOREIGN PATENT DOCUMENTS

| | | | |
|---|---|---|---|
| JP | 2002075368 A * | 3/2002 | |
| JP | 2002-143708 A | 5/2002 | |
| JP | 2004-319105 A | 11/2004 | |
| JP | 2006-019229 A | 1/2006 | |
| JP | 2006-066081 A | 3/2006 | |
| JP | 2006-318815 A | 11/2006 | |
| JP | 2007-012441 A | 1/2007 | |
| JP | 2007-018985 A | 1/2007 | |
| JP | 2007-103339 A | 4/2007 | |
| KR | 10-2002-0024521 A | 3/2002 | |
| KR | 10-2002-0085253 | 11/2002 | |
| KR | 10-2005-0104628 A | 11/2005 | |
| KR | 10-2007-0027985 A | 3/2007 | |
| KR | 10-2007-0056875 A | 6/2007 | |

OTHER PUBLICATIONS

International Search Report for International Application No. PCT/KR2007/005430 dated Jun. 17, 2008.

Written Opinion of the International Searching Authority for International Application No. PCT/KR2007/005430 dated Jun. 17, 2008.

* cited by examiner (b)

(a)

(b)

(a)

CATHODE ACTIVE MATERIAL FOR LITHIUM SECONDARY BATTERIES WITH CORE OF LITHIUM METAL OXIDE AND SHELL OF LITHIUM IRON PHOSPHATE OXIDE, METHOD OF PREPARING THE SAME, AND LITHIUM SECONDARY BATTERIES COMPRISING THE SAME

CROSS-REFERENCES TO RELATED APPLICATIONS

This application is a U.S. national phase application, pursuant to 35 U.S.C. §371, of PCT/KR2007/005430, filed Oct. 31, 2007, designating the United States, which claims priority to Korean Application No. 10-2007-0109034, filed Oct. 29, 2007. The entire contents of the aforementioned patent applications are incorporated herein by this reference.

TECHNICAL FIELD

The present invention relates to a cathode active material for lithium secondary batteries with high safety, a method of preparing the same and lithium secondary batteries comprising the same, and in particular, to a cathode active material for lithium ion secondary batteries or lithium ion polymer batteries, which improves its safety, especially overcharge characteristics and a method of preparing the same.

BACKGROUND ART

With rapid development of electronics, communications and computer industries, camcorders, mobile phones or notebook PCs (Personal Computers) are remarkably being developed. And, as a power source for driving these portable electronic communication equipments, the demand for a lithium secondary battery is increasing day by day. In particular, in application of electric vehicles, uninterruptible power supplies, motor tools or artificial satellites, research and development of the lithium secondary battery as an environmentally friendly power source is lively made inside and outside of the country including Japan, Europe and U.S.A.

A lithium cobalt oxide ($LiCoO_2$) was mainly used as a cathode active material of the lithium secondary battery, however currently other layered cathode material is also used, for example a lithium nickel oxide (Li(Ni—Co—Al)$O_2$) or a lithium composite metal oxide (Li(Ni—Co—Mn)$O_2$), and besides low-costly and highly safe spinel-structured lithium manganese oxide ($LiMn_2O_4$) and olivine-structured lithium iron phosphate compound ($LiFePO_4$) are watched with interest.

However, a lithium secondary battery using the lithium cobalt oxide, lithium nickel oxide or lithium composite metal oxide has excellent basic battery characteristics, but insufficient safety, especially overcharge characteristics. To improve the insufficiency, various safety apparatuses have been introduced, for example a shut-down function of a separator, an additive of an electrolyte liquid or a safety device such as a protection circuit or PTC (Positive Temperature Coefficient) device, however these apparatuses were designed in such a circumstance that filling degree of a cathode active material is not too high. Therefore, when filing degree of a cathode active material is increased to meet the demand for high capacity, the safety apparatuses tend to operate insufficiently, thereby resulting in deterioration of safety.

And, a lithium secondary battery using the spinel-structured lithium manganese oxide was once applied to mobile phones, however after the battery was faced with a mobile phone market in pursuit of advanced function, its advantages of low cost and high safety were not utilized due to reduction of energy density.

And, the olivine-structured lithium iron phosphate compound has advantages of low cost and high safety, but it has a very low electronic conductivity, which makes it difficult to expect excellent battery characteristics and a low average operating potential, which does not meet the demand for high capacity.

Therefore, various studies have been made to solve the above-mentioned problems, but an effective solution has not been suggested to date.

For example, Japanese Laid-open Patent Publication No. 2001-143705 disclosed a cathode active material, in which a lithium cobalt oxide and a lithium manganese oxide were mixed. However, the prior art simply mixed the lithium manganese oxide with high safety, and thus did not achieve a sufficient safety improving effect.

And, Japanese Laid-open Patent Publication No. 2002-143708 suggested a cathode active material, in which lithium nickel composite oxides having different compositions were formed in two layers, however the prior art applied the cathode active material formed of two-layered lithium nickel composite oxides having different compositions, and thus it is not considered that the prior art improved safety against overcharge sufficiently and fundamentally.

Japanese Laid-open Patent Publication No. 2007-012441 applied a cathode having at least two-layered cathode active material layers for the purpose of improving overcharge characteristics, and suggested an olivine-structured lithium iron phosphate oxide or a spinel-structured lithium manganese oxide as a layer adjacent to a cathode current collector. An improved overcharge characteristics are expected, however thickness of the oxide layer is formed below its average particle diameter, i.e. about several an and the oxide layer does not contain a conductive material or a conductive additive, and thus it is not considered that high current discharge characteristics are sufficient.

Japanese Laid-open Patent Publication No. 2006-318815 disclosed a technique for coating the surface of secondary particles with a lithium salt or a lithium oxide to improve durability of a lithium nickel oxide. However, it is difficult to coat the entire surface of the secondary particles of a cathode active material with a uniform thickness, and thus a durability improving effect is not remarkable, and besides a wet coating process and a drying process are added, thereby reducing productivity considerably.

Japanese Laid-open Patent Publication No. 2006-19229 suggested to coat the surface of secondary particles with a lithium cobalt zirconium oxide to improve a poor safety of a lithium nickel oxide. However, a wet coating process is applied to coat the surface of the secondary particles with the lithium cobalt zirconium oxide, and thus a safety improving effect is remarkable, but productivity is limited.

Therefore, it requires to suggest a cathode active material having an excellent safety as well as excellent battery characteristics and a method of preparing the cathode active material having an excellent productivity.

Disclosure

Technical Problem

An object of the present invention is to provide a cathode active material capable of remarkably improving safety, especially overcharge characteristics without deteriorating basic battery characteristics and a method of preparing the cathode active material having excellent reproducibility and productivity.

Technical Solution

In order to achieve the above-mentioned objects, a cathode active material for lithium secondary batteries of the present invention comprises a lithium metal oxide secondary particle core portion formed by aggregation of lithium metal oxide primary particles, and a shell portion formed by coating the secondary particle core portion with an olivine-structured lithium iron phosphate oxide.

As mentioned above with regard to the background art, conventionally the surface of a lithium metal oxide was coated in the form of a thin film to improve its reliability characteristics such as high temperature storage characteristics, however in all cases, the surface of the lithium metal oxide was modified using an electrically inactive material. Accordingly, the inventors found that a battery using a conventional cathode active material has potential adverse effects caused by surface modification, for example reduction of unit capacity of the cathode active material itself or deterioration of high rate characteristics.

However, the cathode active material of lithium secondary batteries of the present invention can improve safety, especially overcharge characteristics without reducing its unit capacity. The cathode active material of the present invention has an excellent safety, in which emission of lithium from the lithium metal oxide corresponding to the core portion is limited because resistance according to overcharge increases by virtue of the olivine-structured lithium iron phosphate oxide even in the case of overcharge.

FIG. 1(b) illustrates schematically a core-shell type cathode active material of the present invention, and shows that the surface of the lithium metal oxide secondary particle (1a) corresponding to the core portion is coated with the olivine-structured lithium iron phosphate oxide (1b) in the form of a film. FIG. 1(a) illustrates schematically a cathode active material prepared by a conventional method. FIG. 1(a) shows the case that a material corresponding to a shell portion is dispersed in alcohol or acetone, mixed with a cathode active material of a core portion, dried and coated.

In the case that the above-mentioned lithium metal oxide secondary particle is spherical, the lithium metal oxide secondary particle may exhibit better a desired effect of the present invention.

The shell portion of the cathode active material of the present invention may further include selectively a metal oxide of 1 to 100 nm size.

And, a method of preparing a cathode active material for lithium secondary batteries of the present invention comprises: (S1) sintering a metal hydroxide and a lithium salt to form a lithium metal oxide secondary particle core portion, in which lithium metal oxide primary particles are aggregated, (S2) dry-coating the core portion with an olivine-structured lithium iron phosphate oxide to form a shell portion outside of the core portion; and (S3) heating the resultant product.

The method of preparing a cathode active material for lithium secondary batteries of the present invention uses a dry coating process to maintain a conductive passivation film on the surface of a cathode active material corresponding to the core portion and efficiently generate the olivine-structured lithium iron phosphate oxide corresponding to the shell portion on the surface of the core portion with excellent reproducibility.

In the method of preparing a cathode active material for lithium secondary batteries of the present invention, heating of the step (S3) is performed at 300 to 600° C. for 4 to 12 hours.

The above-mentioned cathode active material for lithium secondary batteries may be used to manufacture a cathode for lithium secondary batteries and lithium secondary batteries comprising the cathode.

MODE FOR INVENTION

Hereinafter, a cathode active material for lithium secondary batteries of the present invention will be described in detail according to its method. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

First, a metal hydroxide and a lithium salt are sintered to form a lithium metal oxide secondary particle core portion, in which lithium metal oxide primary particles are aggregated (S1).

The lithium metal oxide that can be used in the present invention includes, for an unlimited example, all oxides except an olivine-structured lithium iron phosphate oxide, if it is used as a cathode active material for a lithium secondary battery in the prior art. For example, the lithium metal oxide may be any one selected from the group consisting of $LiCoO_2$, $Li(Ni_aCO_bAl_c)O_2$ ($0<a<1$, $0<b<1$, $0<c<1$, $a+b+c=1$), $Li(Ni_aCO_bMn_c)O_2$ ($0<a<1$, $0<b<1$, $0<c<1$, $a+b+c=1$) and $LiMn_2O_4$, or mixtures thereof, however the present invention is not limited in this regard.

The lithium metal oxide secondary particle used as a core portion in the present invention is produced by aggregation of lithium metal oxide primary particles, and is formed by sintering a metal hydroxide and a lithium salt, and its forming method is described in detail as follows.

Figure 2:
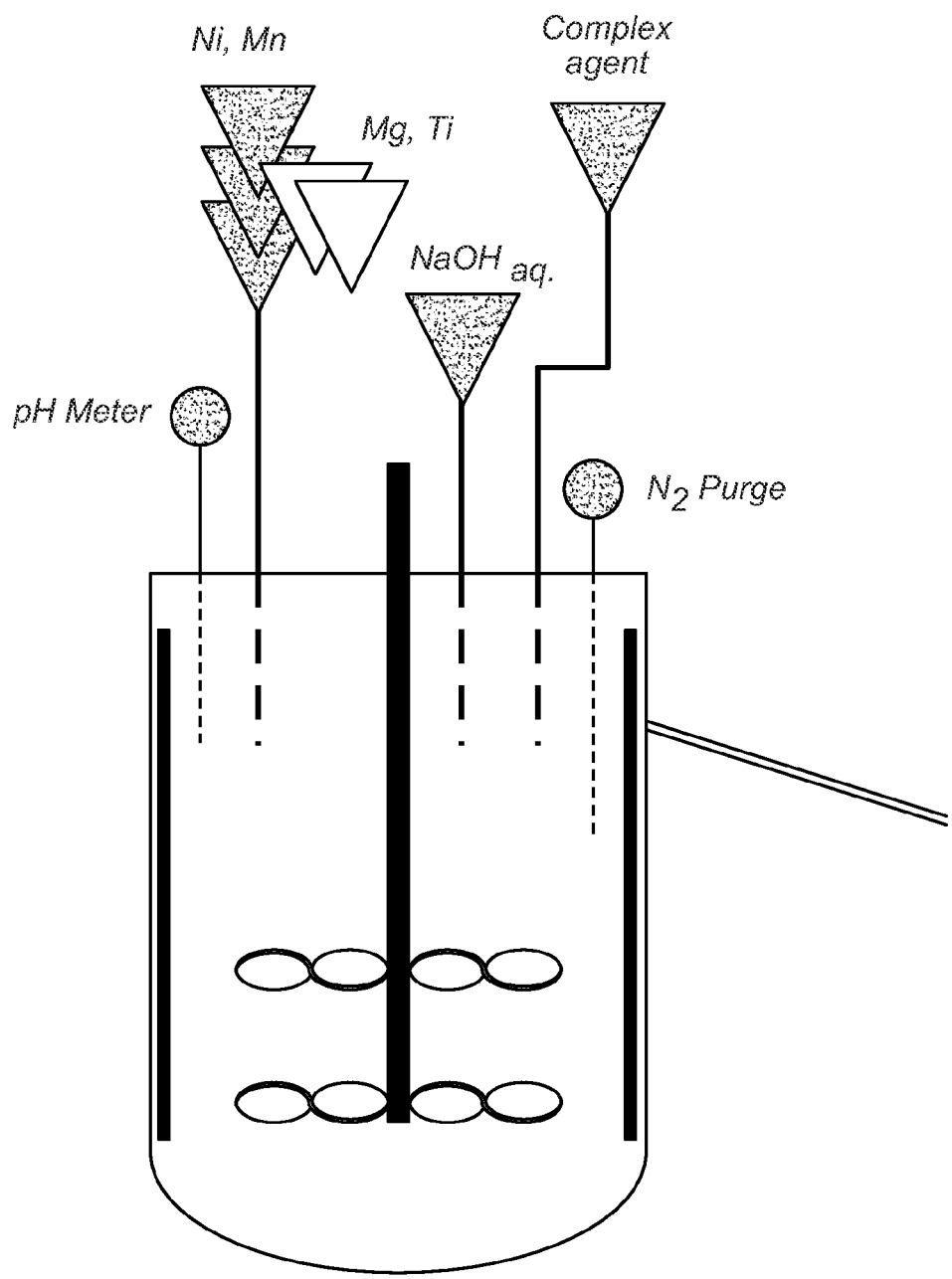
FIG. 2 is a schematic view of a coprecipitation reactor that can be used in the present invention.

The prior art has various methods for generating a metal hydroxide, and the present invention cites a coprecipitation method as an instance. The above-mentioned metal hydroxide uses corresponding raw materials depending on a desired cathode active material. As a main raw material, a metal salt may be sulfate, nitrate or acetate. An aqueous solution containing such a metal salt is put continuously under a coprecipitation atmosphere to obtain continuously a slurry containing a metal hydroxide in the form of a reactant. Then, washing, filtration and drying are performed to generate a metal hydroxide. FIG. 2 illustrates schematically a coprecipitation reactor that can be used in the present invention.

As such, if the metal hydroxide is used to prepare the lithium metal hydroxide, it is possible to prevent an inflow of impurities contained in the metal salt and control composition at a level of atom. And an addition effect of different elements introduced with a small amount can be maximized and a lithium metal oxide having a uniform crystal structure free of impurities can be easily prepared.

Figure 1:
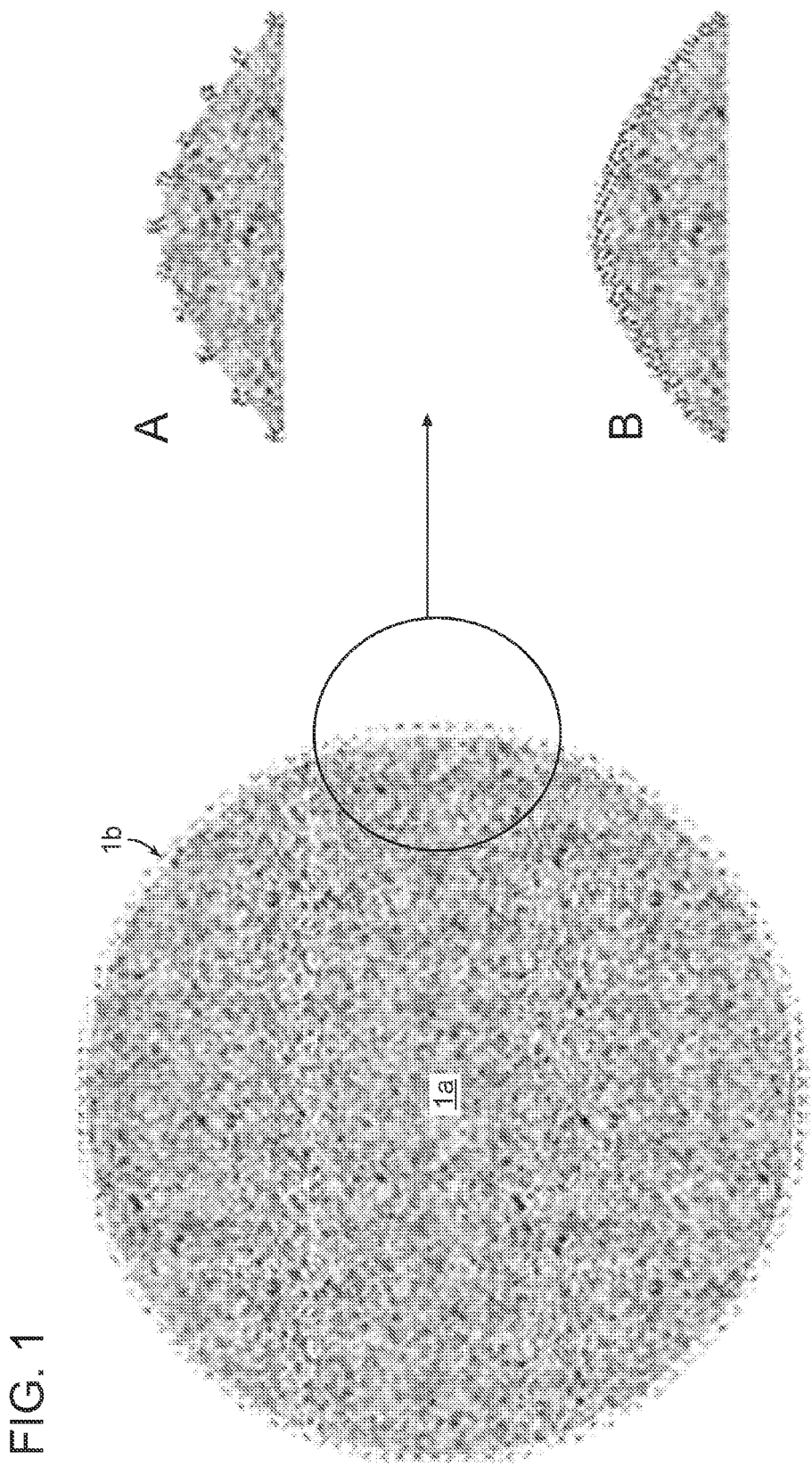
FIG. 1 is a schematic cross-sectional view of a conventional cathode active material (a) and a cathode active material (b) according to the present invention.

The metal hydroxide generated from a raw material precursor using a hydroxide coprecipitation technique as mentioned above is heated at a predetermined temperature and is mixed with various lithium salts for a desired composition. The mixture is sintered under typical sintering conditions to prepare a lithium metal oxide of the present invention. The prepared lithium metal oxide is obtained as a lithium metal oxide secondary particle, in which lithium metal oxide primary particles are aggregated. FIG. 1 illustrates schematically the lithium metal oxide secondary particle (1a) of the present invention.

An average particle diameter of the primary particle which composes the secondary particle may vary depending on a coprecipitation environment such as a composition ratio of the metal hydroxide, and the present invention is not limited to a specific range.

And, an average particle diameter of the secondary particle may vary depending on its purpose of use or forming environment, and may be, for example, 7 to 15 μm, however the present invention is not limited in this regard. In the case that the average particle diameter of the secondary particle is in the above-mentioned range, safety of the secondary particle is improved during a subsequent dry coating process of the olivine-structured lithium iron phosphate oxide and efficiency and reproducibility of the coating process are improved.

The secondary particle is not limited to a specific shape, however a spherical secondary particle may further improve efficiency of the coating process, in which the surface of the secondary particle is coated with the olivine-structured lithium iron phosphate oxide.

Next, the core portion is dry-coated with the olivine-structured lithium iron phosphate oxide to form a shell portion outside of the core portion (S2).

For the cathode active material of the present invention, the cathode active material of the core portion is coated with the olivine-structured lithium iron phosphate oxide having the largest resistance increasing rate according to overcharge, thereby restricting a contact of the cathode active material of the core portion with an electrolyte liquid when overcharging. Thus, an amount of lithium emitted from the cathode active material of the core portion is restricted, and accordingly, an amount of lithium educed on an anode is reduced. As a result, heat caused by reaction with the electrolyte liquid is reduced to exhibit a safety improving effect, especially safety improving effect according to overcharge.

An average particle diameter of the olivine-structured lithium iron phosphate oxide ($LiFePO_4$) may vary depending on its purpose of use and preparing conditions, and the average particle diameter of the olivine-structured lithium iron phosphate oxide can be preferably 1 an or less for objects of the present invention, but it is not limited in this regard. As the average particle diameter is smaller than 1 μm, efficiency of the dry-coating process of the present invention can be maximized, and the average particle diameter may be, for example, 1 nm. In the case that the average particle diameter is more than 1 μm, it is not preferable because efficiency and reproducibility of the surface coating process performed on the composite metal oxide corresponding to the core portion are reduced. That is, in the case that the surface coating process is a dry-coating process, a specific surface area of a nano cathode active material as a coating material should be sufficiently secured so as to coat the surface, i.e. corresponding specific surface area of the cathode active material of the core portion in the form of a film. Therefore, in the case that the average particle diameter of the olivine-structured lithium iron phosphate oxide is more than 1 μm, it is not preferable because a ratio of the cathode active material involved in coating is reduced and a portion of the cathode active material remains as simply mixed.

In the cathode active material of the present invention, the above-mentioned shell portion may further include a metal oxide of 1 to 100 nm size as well as the olivine-structured lithium iron phosphate oxide.

In the case that the metal oxide is in the above-mentioned size range, productivity is excellent and reduction of capacity of a battery is prevented to a maximum, thereby maximizing a shell portion forming effect. Specifically, as an average particle diameter of the metal oxide is smaller, a specific surface area that can be involved in coating is maximized, and thus it is possible to form a shell portion using even a small amount, thereby maximizing a shell portion forming effect. In the case that the size of the metal oxide is less than 1 nm, it is not preferable because a material itself is not easily obtained, which causes an anxiety of an increase in preparing costs of a core-shell type cathode active material. In the case that the size of the metal oxide is more than 100 nm, it is not preferable because its specific surface area is reduced and consequently an amount of a material applied to coat for the shell portion in the form of a film is increased and, in particular, capacity of a battery is reduced.

In the case that the metal oxide of the above-mentioned size is further mixed with the olivine-structured lithium iron phosphate oxide, it can expect a characteristics improving effect by the additional metal oxide as well as an overcharge characteristics improving effect by the olivine-structured lithium iron phosphate oxide.

For example, in the case that an aluminum oxide ($Al_2O_3$) is further mixed, although capacity of a battery is reduced a little, powder characteristics are improved and a binding strength of the olivine-structured lithium iron phosphate oxide is increased, and besides improvement of high temperature characteristics is expected. It is known that the electrically inactive metal oxide exists in the shell portion, and thus a contact of the surface of the lithium metal oxide corresponding to the core portion with an electrolyte liquid is limited during high temperature storage or high temperature cycle, thereby improving the above-mentioned characteristics. And, it is known that a metal oxide such as titanium oxide ($TiO_2$), yttrium oxide ($Y_2O_3$), magnesium oxide (MgO) or zinc oxide (ZnO) shows similar characteristics. And, a lithium metal oxide may be further included, and in this case, it is expected that rapid charge/discharge characteristics or cycleability is improved without reducing the capacity of a battery. The lithium metal oxide may be various lithium metal oxides, for example a layered lithium composite metal oxide, a lithium cobalt oxide or a spinel-structured lithium manganese oxide.

However, a coating material applied to the shell portion is not limited in this regard, and combination of various kinds of nano metal oxide materials may be used according to a desired improvement extent of function of the coating material, i.e. safety, high temperature characteristics or conductivity after they are applied to the shell portion.

A generally known coating method includes a wet coating method and a dry coating method. Conventionally, the wet coating method has been mainly applied for uniform dispersion of a coating material. That is, it was general to perform a coating process such that a dispersion solution or suspension in which a coating material is dispersed or an organic solution or aqueous solution in which a coating material is dissolved, was sprayed or impregnated onto a cathode active material and dried. However, the wet coating method has limitations in coating in the form of a film. In the case that a coating solution using water as a solvent is applied, a conductive passive film formed on the surface of a cathode active material in the form of a lithium salt is removed, and thus conductivity of the cathode active material itself is reduced. And, drying and grinding are required additionally, thereby limiting mass production.

On the contrary, in the dry coating method used in the present invention, the surface of a cathode active material corresponding to a core portion is coated with a coating material corresponding to a shell portion by a mechanical method. In this case, a shear force, a collision force and a compression force exhibit according to equipment used for coating, and thus simple mixing to coating is possible.

Generally, a cathode active material obtained by sintering a metal hydroxide as a raw material precursor and lithium at high temperature requires grinding and classification because the sintering is performed by the hydroxide raw material precursor or excess of lithium, of which part of them has a reduced sphericity at the high temperature. Conventionally, however, it was substantially impossible to grind the cathode active material to an average particle diameter of the raw material precursor, i.e. metal hydroxide while maintaining sphericity of the raw material precursor.

However, in the case that coating is performed using a mechanical method as in the present invention, sphericity and disintegration effects of the lithium metal oxide corresponding to the shell portion occur simultaneously by virtue of the nano metal oxide corresponding to the shell portion, thereby improving powder characteristics.

Subsequently, the resultant product is heated (S3).

Through a heating process after coating, individual particles of the lithium metal oxide corresponding to the shell portion are released from stress by sintering and mechanical dry-coating, thereby preventing reduction of specific capacity or powder conductivity caused by coating of the electrically inactive metal oxide. Heating conditions may be properly selected depending on a preparation environment such as kind of the cathode active material of the core portion, for example the heating may be performed at 300 to 600° C. for 4 to 12 hours, however the present invention is not limited in this regard. At the above-mentioned heating temperature, density of the shell portion is excellent, crystal structure deficiency of the core portion can be sufficiently supplemented and structure of the core portion can be maintained stably. Regarding the heating time, a preferable effect may be obtained sufficiently in the above-mentioned range, and if the heating time is more than 12 hours, an additional effect by the increased heating time may not be expected.

The above-mentioned cathode active material of a lithium secondary battery according to the present invention may be adhered to at least one surface of a cathode collector using a binder resin to form a cathode of the lithium secondary battery. Typical binder resin and cathode collector used in the prior art may be used unlimitedly.

And, a cathode of a lithium secondary battery according to the present invention may be used in manufacturing the lithium secondary battery comprising an anode, a separator interposed between the anode and the cathode, and an electrolyte. Typical anode, separator and electrolyte used in the prior art may be used unlimitedly.

Hereinafter, the preferred embodiments of the present invention are described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Preparing of Lithium Composite Metal Oxide

Nickel sulfate ($NiSO_4 \cdot 6H_2O$), manganese sulfate ($MnSO_4 \cdot H_2O$), cobalt sulfate ($CoSO_4 \cdot 7H_2O$) were dissolved in a purified ion-exchanged water with a mol ratio of nickel, cobalt and mangan being 0.5:0.2:0.3 to prepare an aqueous metal solution. And, an aqueous sodium hydroxide solution and an aqueous ammonia solution were prepared.

The aqueous metal solution and the aqueous ammonia solution were provided at the speed of 5 L/hr and 0.5 L/hr, respectively, in a coprecipitation reactor, of which pH is 11.5 and rotation rate was 400 rpm under an inactive nitrogen atmosphere using a metering pump. The aqueous sodium hydroxide solution was intermittently put such that the pH of the solution in the reactor was maintained at 11.5.

The reaction was performed for 48 hours or more to obtain a slurry containing a composite metal hydroxide of uniform size. The slurry was washed and filtered using a centrifugal separation filter such that a pH of a filtered liquid was 9.0 or less, and the obtained composite metal hydroxide powder was dried at 120° C. for 24 hours or more to generate a composite metal hydroxide.

Next, for a precise Stoichiometric ratio with a lithium salt, the composite metal hydroxide was heated at temperature of 300° C. or more for 12 hours or more, and was mixed with the lithium salt with Stoichiometric ratio of 1:1.1. The mixture was sintered in a high temperature furnace with a temperature control function at 950° C. for 24 hours and at 500° C. for 24 hours. Then, grinding and classification were performed to generate a composite metal oxide having a controlled average particle diameter. The generated composite metal oxide was heated at 500° C. for 4 hours.

Next, a test was performed on characteristics of the obtained composite metal oxide. The generated composite metal oxide had an Ni:Co:Mn ratio of 0.50:0.20:0.30 and an average particle diameter of 9.6 μl. The results are shown in Tables 1 and 2.

<Preparing of Core-Shell Type Cathode Active Material>

A core-shell type cathode active material was prepared using the obtained composite metal oxide as a core portion and an olivine-structured lithium iron phosphate oxide having an average particle diameter D50 of 500 nm as a coating material. 9 g of the olivine-structured lithium iron phosphate oxide corresponding to a shell portion was mixed with 600 g of the composite metal oxide using a dry coating system (Japan, Hosokawa micron Ltd. NOB-130) such that a weight ratio of the olivine-structured lithium iron phosphate oxide to the core portion was 1.5%. Then, the mixture was treated with a rotation rate of 2700 rpm for 3 minutes and heated at 500° C. for 4 hours to prepare a core-shell type cathode active material.

Example 2

A cathode active material was prepared by the same method as that of the Example 1, except that a weight ratio of an olivine-structured lithium iron phosphate oxide to a core portion is 2.5%.

Example 3

A cathode active material was prepared by the same method as that of the Example 1, except that weight ratios of an olivine-structured lithium iron phosphate oxide and an aluminum oxide having an average particle diameter of 13 nm to a core portion are 1.5% and 0.3%, respectively.

Example 4

A cathode active material was prepared by the same method as that of the Example 1, except that weight ratios of an olivine-structured lithium iron phosphate oxide and an aluminum oxide having an average particle diameter of 13 nm to a core portion were 0.5% and 0.5%, respectively.

Example 5

A cathode active material was prepared by the same method as that of the Example 1, except that an Ni:Co:Mn ratio of a composite metal oxide was 0.40:0.30:0.30 and a weight ratio of an olivine-structured lithium iron phosphate oxide to a core portion was 1.5%.

Comparative Example 1

A cathode active material was prepared by the same method as that of the Example 1, except that a weight ratio of an aluminum oxide having an average particle diameter of 13 nm to a core portion was 1.0%.

Comparative Example 2

A cathode active material was prepared by the same method as that of the Example 1, except that an olivine-structured lithium iron phosphate oxide having an average particle diameter of 3 μm was used for a shell portion.

Comparative Example 3

A cathode active material was prepared by the same method as that of the Example 1, except that the composite metal oxide obtained in the Example 5 was used for a core portion and a weight ratio of an aluminum oxide as a coating material having an average particle diameter of 13 nm to the core portion was 1.5%.

Comparative Example 4

A cathode active material was prepared by the same method as that of the Example 1, except that the composite metal oxide obtained in the Example 5 was used for a core portion, the aluminum oxide having an average particle diameter of 13 nm obtained in the comparative example 1 was used as a coating material corresponding to a shell portion, the composite metal oxide and the aluminum oxide were dispersed in an aqueous solution such that a weight ratio of the aluminum oxide having an average particle diameter of 13 nm to the core portion was 1.0% to prepare a dispersion solution, and the dispersion solution was uniformly mixed using a ball mill and dried.

Characteristics Evaluation

1. Powder Characteristics

An average particle diameter was measured using a particle size analysis system (Malvern Instruments, Mastersizer 2000E). An average particle diameter $D_{50}$ was measured using a laser diffraction technology while particles were dispersed using ultrasonic waves. A tap density was measured from a change in volume before and after 500 times of strokes using 100 ml mass cylinder, and measurement results are shown in Table 1.

As shown in Table 1, it is found that, in comparison with comparative example 4 prepared by a wet coating process, core-shell type cathode active materials prepared by Examples 1 to 6 of the present invention or comparative examples 1 to 3 were prepared by a dry coating process, and thus powder characteristics were improved by sphericity and disintegration effects by virtue of a coating material corresponding to a shell portion.

In the case of comparative example 2, it is found that, because an average particle diameter of an olivine-structured lithium iron phosphate oxide corresponding to a shell portion was 3 μm, i.e. was too large, a small-sized particle was involved in coating and a large-sized particle was involved in simply uniform mixing, and thus powder characteristics were not good.

And, in the case of comparative example 4, because an aluminum oxide corresponding to a shell portion was coated by a wet coating process, a sphericity or disintegration effect could not be expected. And, it is found that a portion of powder characteristics was deteriorated by an additional drying process, for example a diameter was increased or a tap density was reduced.

2. Coating Characteristics
i) Surface Shape

Figure 3:
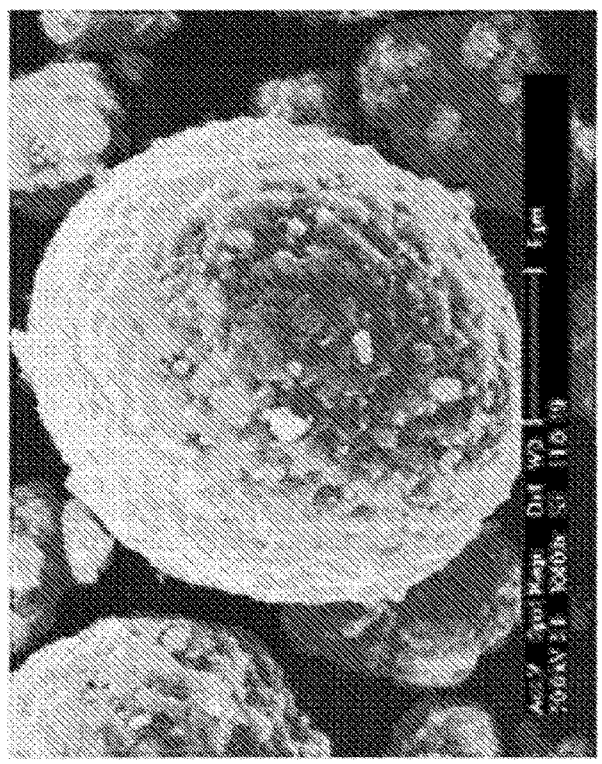
FIG. 3 shows SEM (Scanning Electron Microscope) photographs of a cathode active material according to the present invention, prepared by Example 1.
Figure 3:
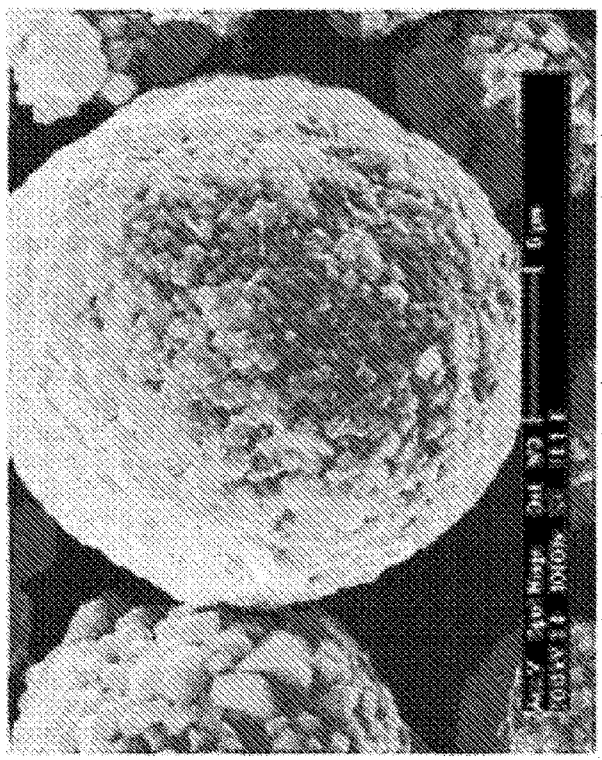
Figure 4:
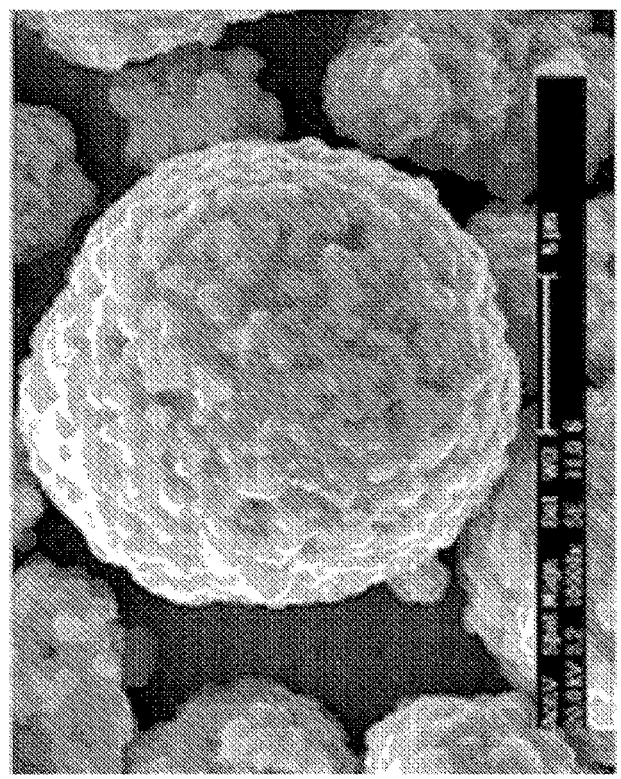
FIG. 4 shows SEM photographs of a cathode active material prepared by comparative example 1.
Figure 4:
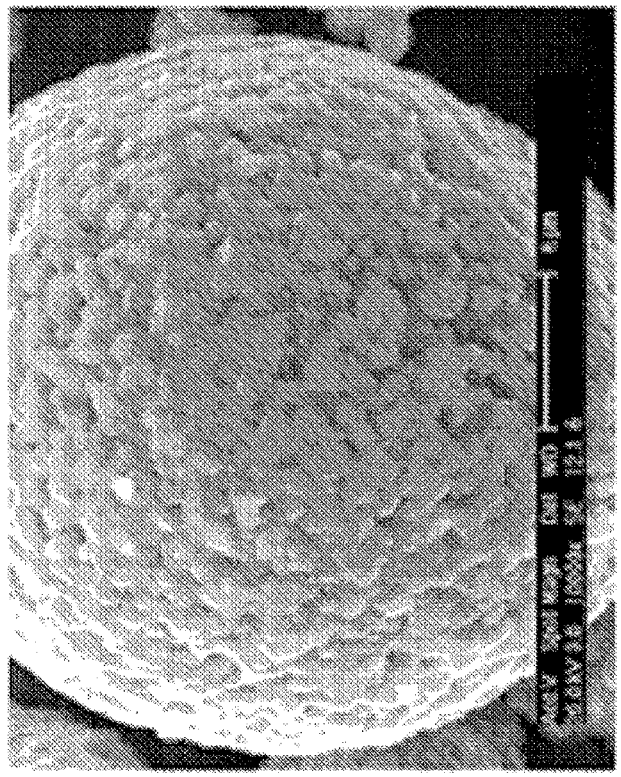
Figure 5A:
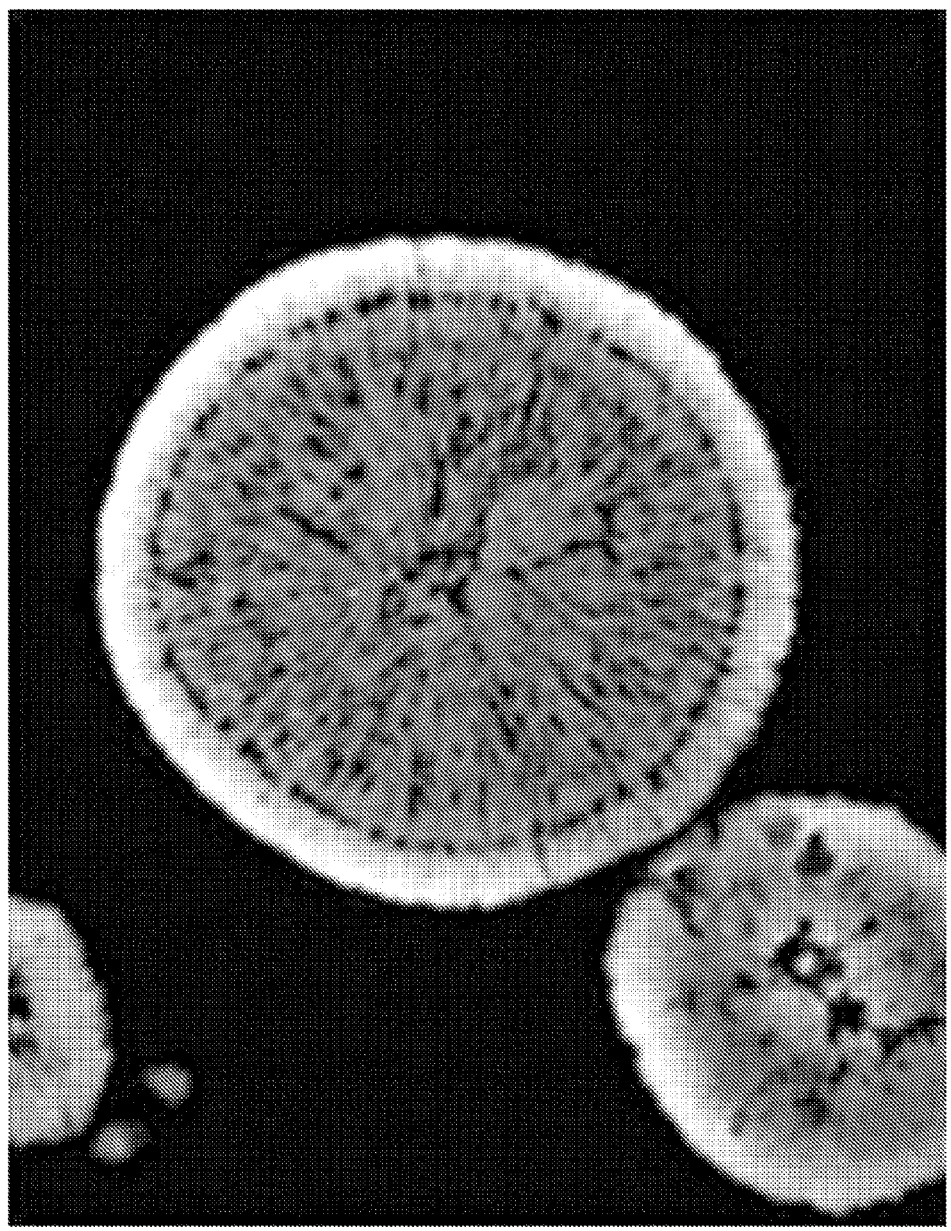
FIG. 5 shows SEM photographs of cross-sectional mapping of particles of the cathode active material according to the present invention, prepared by Example 1.
Figure 5C:
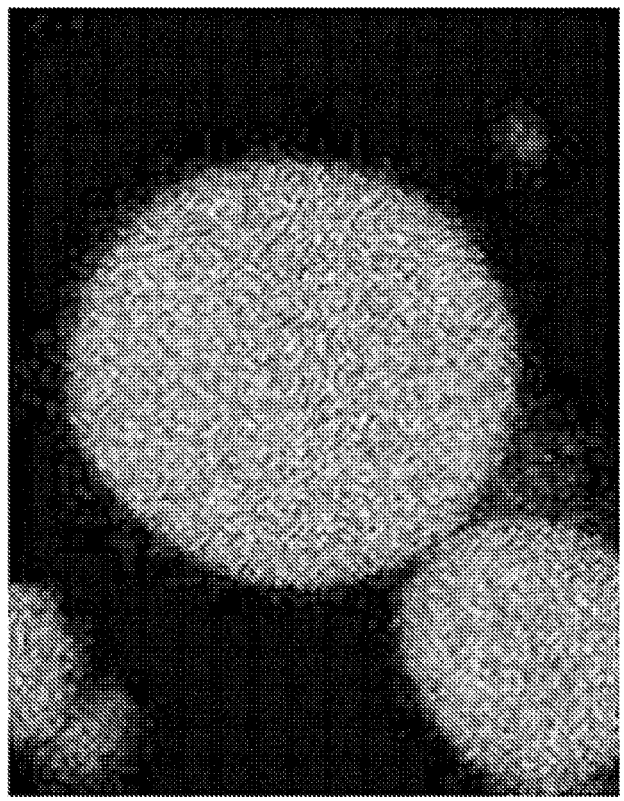
Figure 5B:
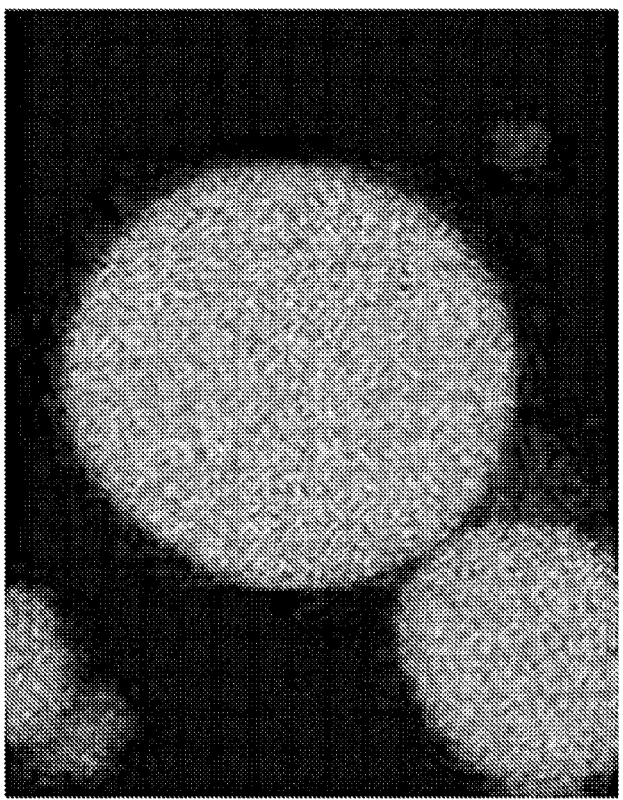
Figure 5E:
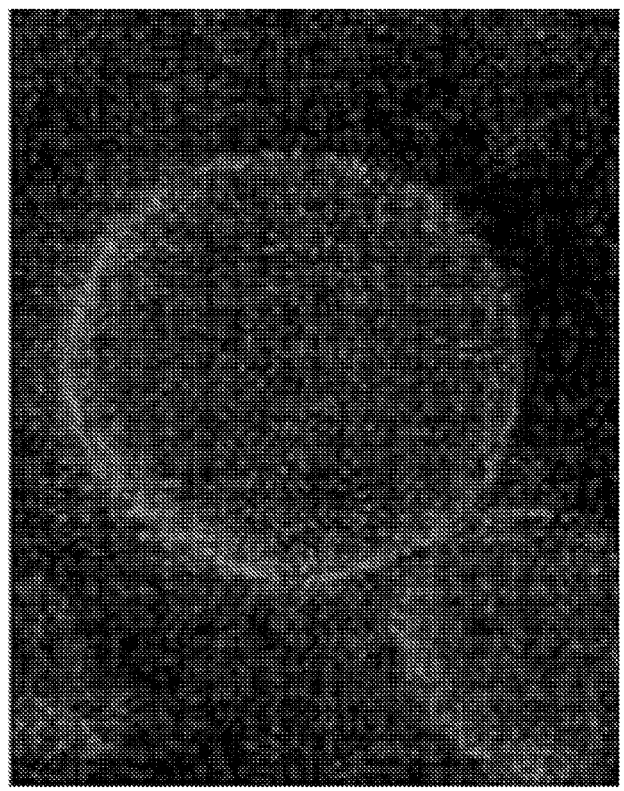
Figure 5D:
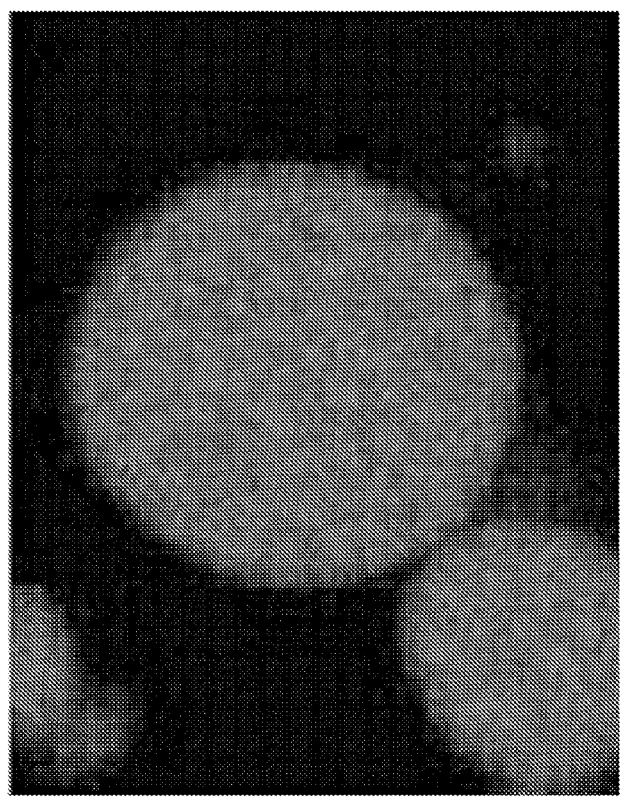

To check the shape and surface characteristics of core-shell type cathode active materials obtained in the examples and comparative examples, SEM (HP, 8564E) photographs were taken, and SEM photographs of Example 1 and comparative example 1 are shown in FIG. 3 (a: before coating, b: after coating) and FIG. 4 (a: before coating, b: after coating), respectively. And, cross-sectional mapping of a particle and mapping of each constituent element of a core-shell type cathode active material obtained in Example 1 are shown in FIG. 5 (a: cross-sectional mapping, b: Ni mapping, c: Co mapping, d: Mn mapping, e: Fe mapping). The mapping of each constituent element of a core-shell type cathode active material obtained in comparative example 2 is shown in FIG. 6.

As shown in FIG. 4, the cathode active material of the present invention has a good surface shape. And, as shown in FIG. 5, it is found that, in the case of a particle of a cathode active material obtained in Example 1, each constituent element of a composite metal oxide corresponding to a core portion is uniformly distributed and the surface of the core portion is uniformly with a shell portion.

Figure 6:
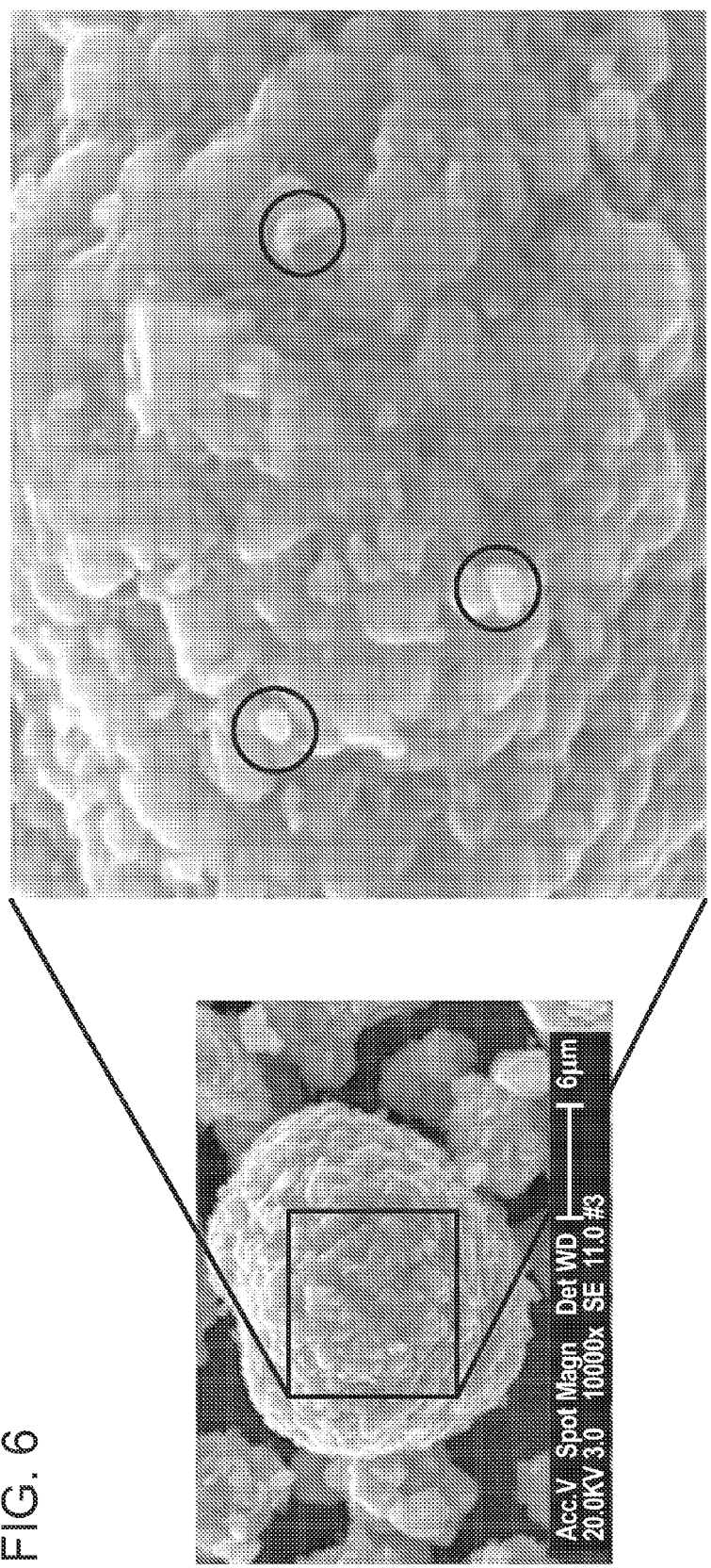
FIG. 6 shows SEM photographs of the surface of a cathode active material prepared by comparative example 2.

On the other hand, as shown in FIG. 6, it is found from comparative example 2 that, in the case that an olivine-structured lithium iron phosphate oxide corresponding to a shell portion has a large average particle diameter, a small-sized particle is involved in coating and a large-sized particle is shown on the surface of a core portion in the shape of a spot, or particles are simply mixed to reduce a coating efficiency, thereby failing to obtain a uniform film-shaped coating.

Figure 7:
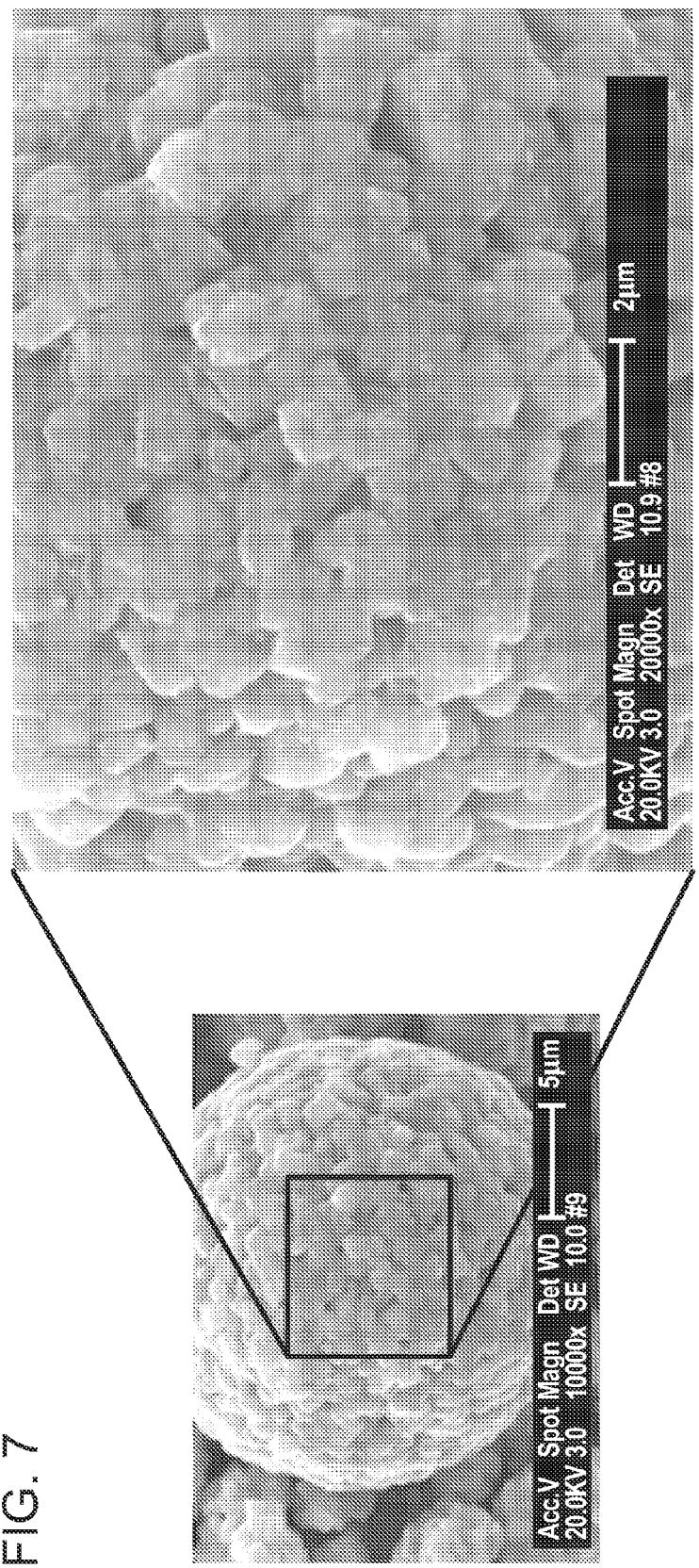
FIG. 7 shows SEM photographs of the surface of a cathode active material prepared by comparative example 4.

And, as shown in FIG. 7, it is found from comparative example 4 that, in the case that a shell portion is formed by a wet coating process, the shell portion is not formed in the form of a film as desired by the present invention, but in the form of a spot.

ii) Coating Efficiency

To judge a coating efficiency, a change in surface potential according a film coating was checked. For this purpose, measurement was made on each surface potential of a core-shell type cathode active materials, in which a lithium composite metal oxide prepared in Example 5 was coated with an aluminum oxide used as a coating material in comparative example 3, and a material, in which a lithium composite metal oxide prepared in Example 5 was simply mixed with an aluminum oxide used as a coating material in comparative example 3, and measurement results are shown in FIG. 8.

Figure 8:
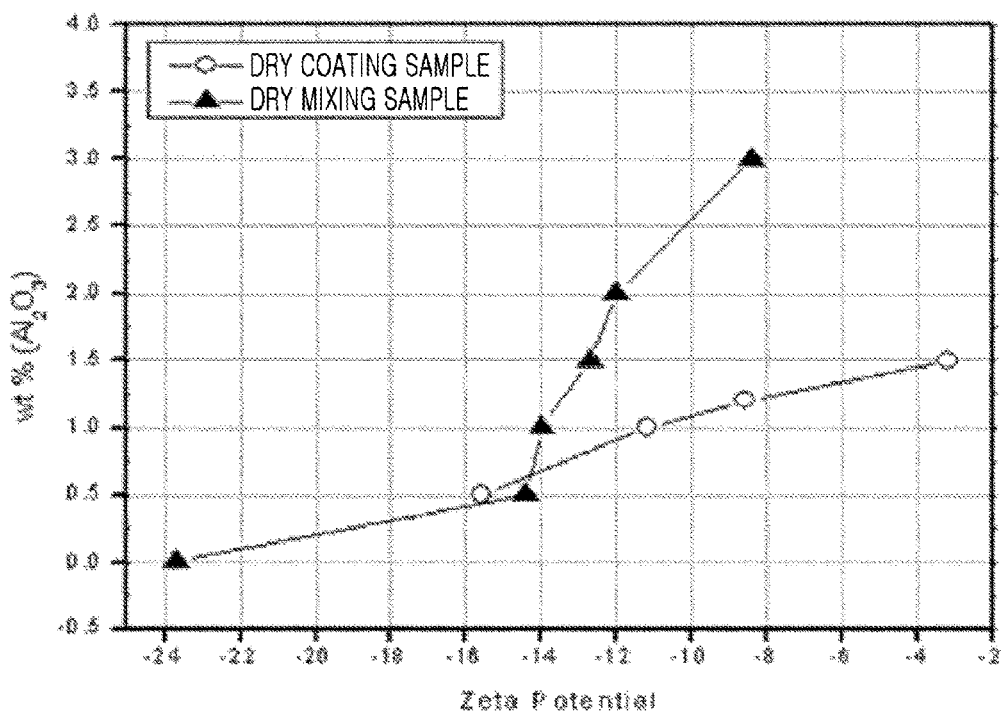
FIG. 8 is a graph illustrating Zeta potential behavior of cathode active materials according as a lithium metal oxide core portion is coated with an aluminum oxide or is simply mixed with it.

As found in FIG. 8, generally the surface of a cathode active material creates a negative potential, but after coating of the aluminum oxide it behaves as if it creates a neutral potential. A core-shell cathode active material surface-modified by an aluminum oxide was coated with the aluminum oxide creating a positive potential, and as a result, the surface of a composite metal oxide corresponding to a core portion is not exposed, and thus it is found that surface potential characteristics are changed largely. However, it is found that, in the case that an aluminum oxide is simply mixed, surface potential characteristics do not change because a cathode active material exhibiting a negative potential and an aluminum metal oxide exhibiting a positive potential exist together.

3. Electrochemical Characteristics
i) Half Cell Evaluation

To evaluate initial specific capacity and efficiency of the obtained composite metal oxide and core-shell type cathode active material, a slurry was prepared by mixing a cathode active material with an NMP (N-methylpyrrolidone) solution, in which a teflonized acetylene black as a conductive material and PVDF (polyvinylidene fluoride) as a binder material are dissolved. A mass ratio between the cathode active material, conductive material and binder material was 86/8/6. The slurry was applied on 30 μm Al current collector, dried, compressed to a uniform thickness and punched to a diameter of 13 mm, so that a cathode was manufactured.

Figure 9:
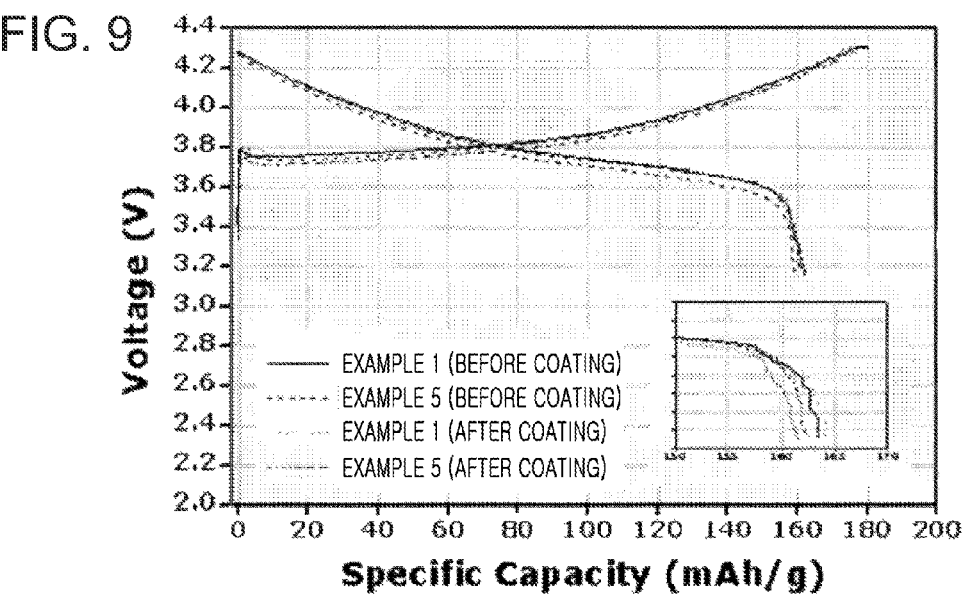
FIG. 9 is a graph illustrating initial charge and discharge curves of cathode active materials according to the present invention, prepared by Examples 1 and 5.

2032 coin battery was manufactured using the cathode, a lithium foil as an anode, a separator as a medium, and $LiPF_6$ solution (1.2 M) of a mixed solvent of ethylene carbonate and diethyl carbonate (volume ratio 1:3) as an electrolyte liquid. A charge/discharge experiment was made on the battery at 25° C. in a voltage range of 2.5 to 4.3V under current density conditions of 0.2 C using a charge/discharge cycle system to measure an initial charge/discharge capacity, and the measurement results are shown in Table 2, and initial charge/discharge curves before and after coating of Examples 1 and 5 are shown in FIG. 9.

As shown in Table 2, it is found that, in the case that a coating material corresponding to a shell portion is an electrochemically active olivine-structured lithium iron phosphate oxide, a specific capacity per unit mass of a cathode active material is maintained without reduction, whereas as in Examples 3, 4 and 6 and comparative examples 1 and 3, in the case that a shell portion is formed using an electrochemically inactive metal oxide as a coating material, a specific capacity per unit mass of a cathode active material tends to reduce.

A small amount of aluminum oxide was added to reduce capacity to an extent, however the present invention has a powder characteristics improving effect by addition of aluminum oxide and a binder effect for binding the olivine-structured lithium iron phosphate oxide more strongly by a nanometer size. And, as in this examples, in the case that a coating is performed in the shape of a shell by a dry coating process, an additional function may be provided according to coating materials.

ii) Full Cell Evaluation

To evaluate battery characteristics of the core-shell type cathode active material obtained in the examples and comparative examples, a slurry was prepared by mixing a cathode active material with an NMP solution, in which a conductive carbon as a conductive material and PVDF as a binder material are dissolved. A mass ratio between the cathode active material, conductive material and binder material was 92/4/4. Graphite was used as an anode and a separator was used as a medium, and the cathode and the anode were placed opposite to each other, an aluminum exterial material having a thickness of 113 μm an was applied, and they were sealed in a globe box of an argon atmosphere and compressed by heat to manufacture a pouch cell. The cell had a size of 3.7 mm thick×64 mm wide×95 mm long and a design capacity of 2000 mAh.

The cell was initially charged and discharged using a charge/discharge cycle system at 25° C. in a voltage range of 3.0 to 4.2V under current density conditions of 0.2 C (400 mAh) and a charge/discharge experiment was made with various current densities. High rate characteristics were evaluated from a ratio of a discharge capacity at current density of 20 C to a discharge capacity at current density of 0.5 C that is a standard capacity. The high rate characteristics before and after coating are shown in Table 3, and high rate discharge characteristics of Example 1 are shown in FIG. 10.

Figure 10:
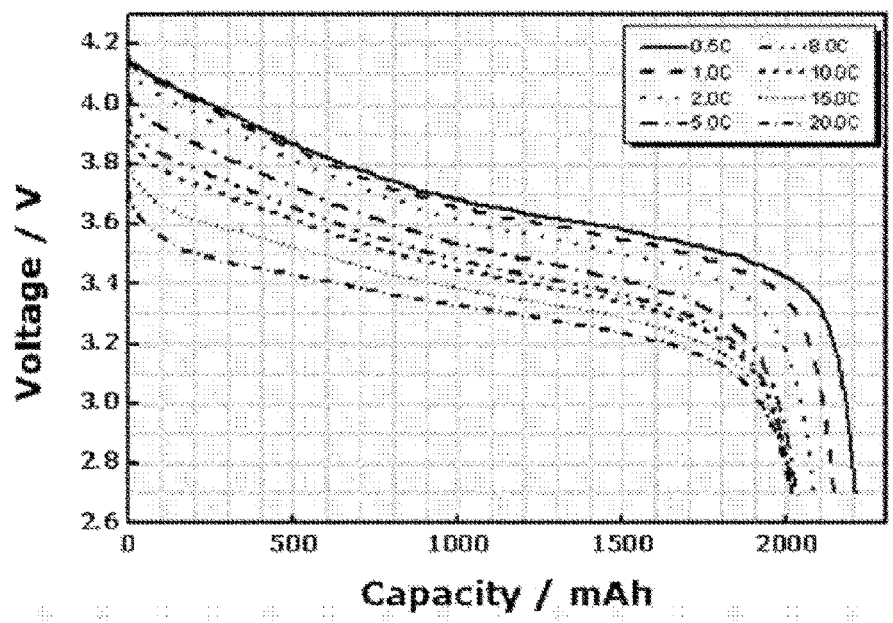
FIG. 10 is a graph illustrating discharge characteristics according to current density of the cathode active material according to the present invention, prepared by Example 1.

As shown in Table 3 and FIG. 10, it is found that a portion of high rate characteristics is deteriorated by coating of the olivine-structured lithium iron phosphate oxide, however discharge characteristics of the cathode active material are maintained excellently.

Figure 11:
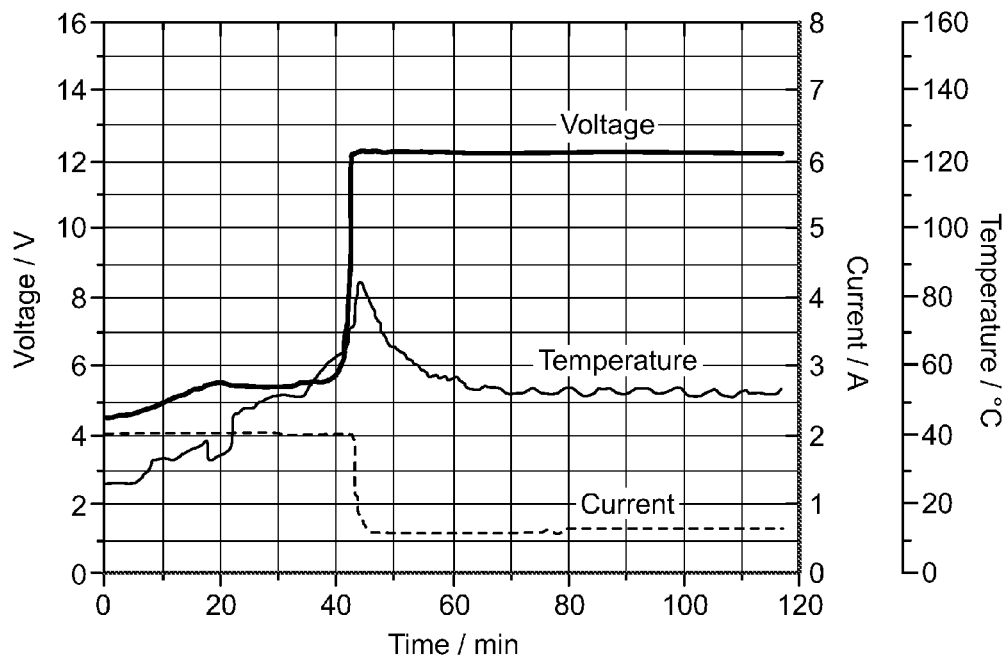
FIG. 11 is a graph illustrating overcharge characteristics at 12V of a cathode active material according to the present invention, prepared by Example 2.
Figure 12:
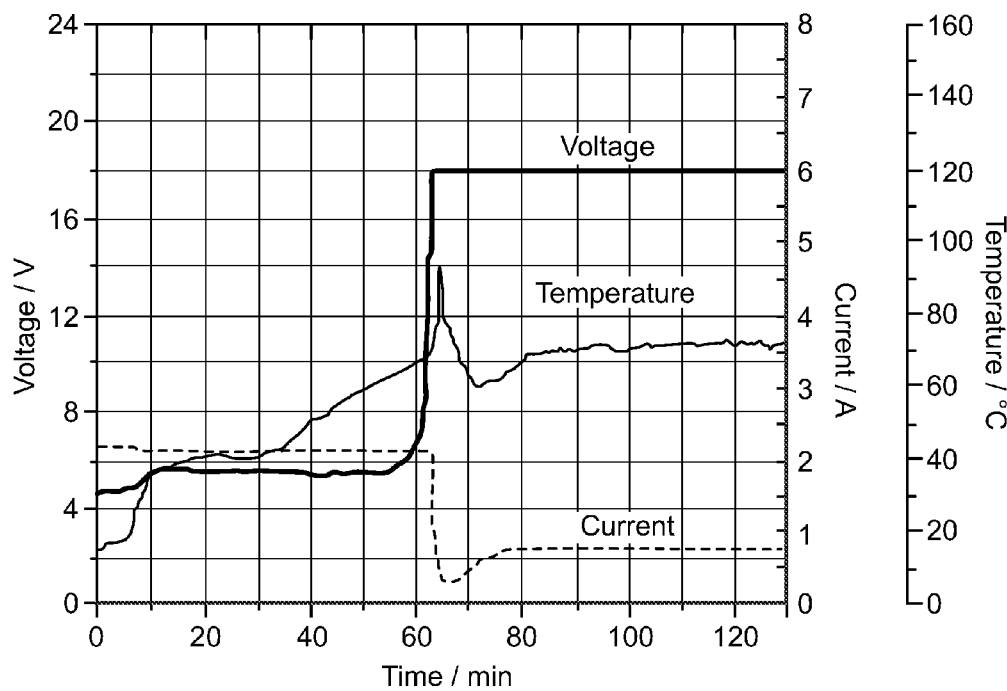
FIG. 12 is a graph illustrating overcharge characteristics at 18V of the cathode active material according to the present invention, prepared by Example 2.
Figure 13:
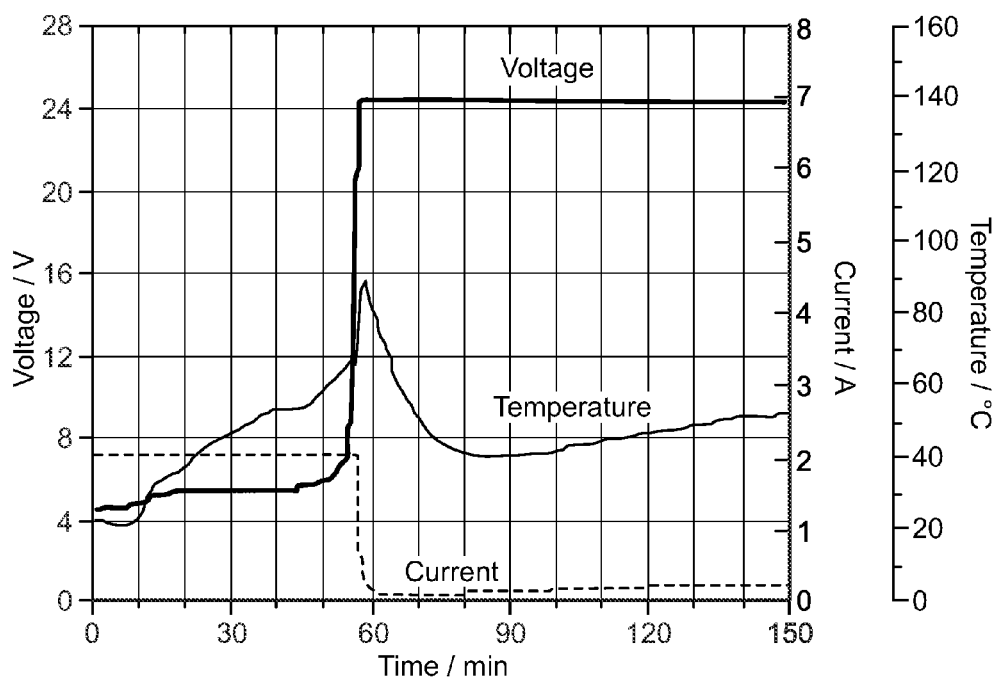
FIG. 13 is a graph illustrating overcharge characteristics at 24V of the cathode active material according to the present invention, prepared by Example 2.
Figure 14:
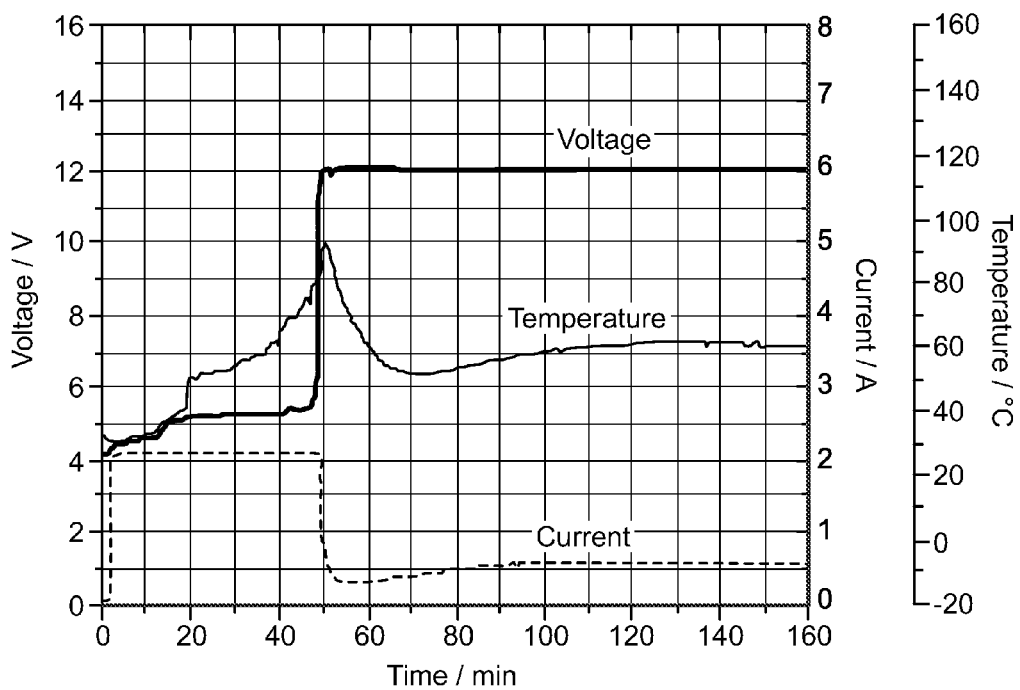
FIG. 14 is a graph illustrating overcharge characteristics at 12V of the cathode active material prepared by comparative example 2.
Figure 15:
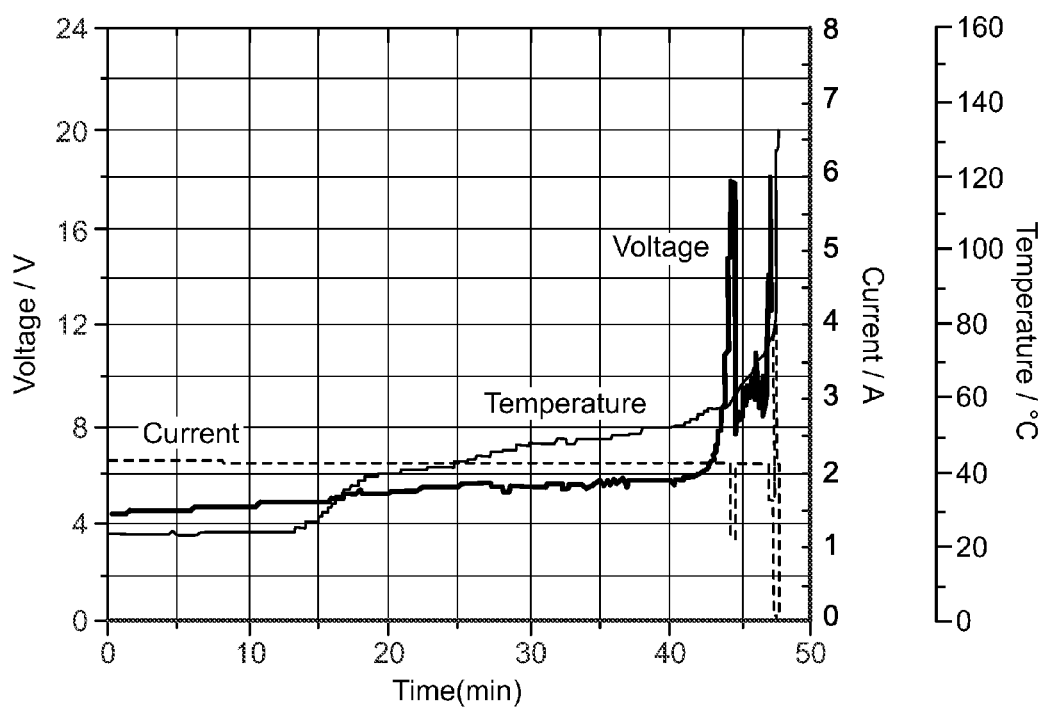
FIG. 15 is a graph illustrating overcharge characteristics at 18V of the cathode active material prepared by comparative example 2.

And, to evaluate overcharge characteristics of the core-shell type cathode active material obtained in the examples and comparative examples, a cell of the same dimension was used, and measurement was performed on ignition, explosion and cell surface temperature according to overcharge at 12V, 18V and 24V under current density conditions of 1 C (2000 mAh). FIGS. 11, 12 and 13 show graphs of overcharge characteristics of a battery manufactured using the cathode active material prepared in Example 2, measured at 12V, 18V and 24V, respectively. FIGS. 14 and 15 show graphs of overcharge characteristics of a battery manufactured using the cathode active material prepared in comparative example 2, measured at 12V and 18V, respectively.

As shown in Table 3, it is found that an example, in which a shell portion is formed using an olivine-structured lithium iron phosphate oxide exhibited a considerably improved safety according to overcharge, whereas comparative examples 1 and 3, in which a shell portion is formed using only an aluminum oxide exhibited the improved powder characteristics, but did not improve safety according to overcharge. And, it is found that, in the case of comparative example 2, because an average particle diameter of an olivine-structured lithium iron phosphate oxide itself of a shell portion is large, the shell portion exists at only a portion of a battery, and thus safety according to overcharge could not be improved.

TABLE 1

| | | Before coating | | | After coating | | | |
|---|---|---|---|---|---|---|---|---|
| Classification | Empirical formula | Average particle diameter ($d_{50}$-μm) | Tap density (g/cc) | Coating material$^a$ (%) | Average particle diameter ($d_{50}$-μm) | Rate of change (%) | Tap density (g/cc) | Rate of change (%) |
| Example 1 | $Li(Ni_{0.5}Co_{0.2}Mn_{0.3})O_2$ | 9.95 | 2.44 | P 1.5% | 9.21 | −7.4 | 2.47 | +1.2 |
| Example 2 | $Li(Ni_{0.5}Co_{0.2}Mn_{0.3})O_2$ | 9.95 | 2.44 | P 2.5% | 9.20 | −7.5 | 2.49 | +2.0 |
| Example 3 | $Li(Ni_{0.5}Co_{0.2}Mn_{0.3})O_2$ | 9.95 | 2.44 | P 1.5%-A 0.3% | 9.18 | −7.7 | 2.55 | +4.5 |
| Example 4 | $Li(Ni_{0.5}Co_{0.2}Mn_{0.3})O_2$ | 9.95 | 2.44 | P 0.5%-A 0.5% | 9.15 | −8.0 | 2.58 | +5.7 |
| Example 5 | $Li(Ni_{0.4}Co_{0.3}Mn_{0.3})O_2$ | 9.65 | 2.39 | P 1.5% | 9.02 | −6.5 | 2.47 | +3.3 |
| Comparative example 1 | $Li(Ni_{0.5}Co_{0.2}Mn_{0.3})O_2$ | 9.95 | 2.44 | A 1.0% | 9.03 | −9.2 | 2.61 | +7.0 |
| Comparative example 2 | $Li(Ni_{0.5}Co_{0.2}Mn_{0.3})O_2$ | 9.95 | 2.44 | P 1.5% | 9.90 | −0.5 | 2.41 | −1.2 |
| Comparative example 3 | $Li(Ni_{0.4}Co_{0.3}Mn_{0.3})O_2$ | 9.65 | 2.39 | A 1.5% | 8.99 | −6.8 | 2.65 | +10.9 |
| Comparative example 4 | $Li(Ni_{0.4}Co_{0.3}Mn_{0.3})O_2$ | 9.65 | 2.44 | A 1.0% | 10.24 | +6.0 | 2.38 | −2.0 |

$^a$P: $LiFePO_4$,
A: Aluminum Oxide

TABLE 2

| | | Before coating | | | After coating | | |
|---|---|---|---|---|---|---|---|
| Classification | Empirical formula | $1^{st}$ charge | $1^{st}$ discharge | $1^{st}$ efficiency | $1^{st}$ charge | $1^{st}$ discharge | $1^{st}$ efficiency |
| Example 1 | $Li(Ni_{0.5}Co_{0.2}Mn_{0.3})O_2$ | 181.1 | 163.5 | 90.3 | 182.3 | 164.2 | 90.1 |
| Example 2 | $Li(Ni_{0.5}Co_{0.2}Mn_{0.3})O_2$ | 183.7 | 165.1 | 89.9 | 182.0 | 166.0 | 91.2 |
| Example 3 | $Li(Ni_{0.5}Co_{0.2}Mn_{0.3})O_2$ | 184.9 | 166.1 | 89.8 | 184.5 | 165.0 | 89.4 |
| Example 4 | $Li(Ni_{0.5}Co_{0.2}Mn_{0.3})O_2$ | 184.4 | 166.3 | 90.2 | 183.8 | 164.9 | 89.7 |
| Example 5 | $Li(Ni_{0.4}Co_{0.3}Mn_{0.3})O_2$ | 178.8 | 161.6 | 90.4 | 179.6 | 162.6 | 90.5 |
| Comparative example 1 | $Li(Ni_{0.5}Co_{0.2}Mn_{0.3})O_2$ | 185.2 | 165.0 | 89.1 | 183.9 | 163.8 | 89.1 |
| Comparative example 2 | $Li(Ni_{0.5}Co_{0.2}Mn_{0.3})O_2$ | 187.8 | 167.5 | 89.2 | 189.3 | 167.6 | 88.5 |
| Comparative example 3 | $Li(Ni_{0.4}Co_{0.3}Mn_{0.3})O_2$ | 177.7 | 161.5 | 90.9 | 179.1 | 160.5 | 89.6 |

TABLE 3

| | | Coating material$^a$ (%) | 20 C. discharge characteristics (@0.5 C., %) | Cell behavior and maximum cell surface temperature after coating (° C.) | | |
|---|---|---|---|---|---|---|
| Classification | Empirical formula | | | 12 V | 18 V | 24 V |
| Example 1 | $Li(Ni_{0.5}Co_{0.2}Mn_{0.3})O_2$ | P 1.5% | 90.1 | A, 85 | A, 86 | C, — |
| Example 2 | $Li(Ni_{0.5}Co_{0.2}Mn_{0.3})O_2$ | P 2.5% | 87.5 | A, 82 | A, 93 | A, 88 |
| Example 3 | $Li(Ni_{0.5}Co_{0.2}Mn_{0.3})O_2$ | P 1.5%-A 0.3% | 87.3 | A, 81 | A, 87 | C, — |
| Example 4 | $Li(Ni_{0.5}Co_{0.2}Mn_{0.3})O_2$ | P 0.5%-A 0.5% | 88.6 | A, 82 | B, 138 | C, — |

TABLE 3-continued

| Classification | Empirical formula | Coating material$^a$ (%) | 20 C. discharge characteristics (@0.5 C., %) | Cell behavior and maximum cell surface temperature after coating (° C.) | | |
|---|---|---|---|---|---|---|
| | | | | 12 V | 18 V | 24 V |
| Example 5 | Li(Ni$_{0.4}$Co$_{0.3}$Mn$_{0.3}$)O$_2$ | P 1.5% | 80.0 | A, 88 | B, 147 | D, — |
| Comparative example 1 | Li(Ni$_{0.5}$Co$_{0.2}$Mn$_{0.3}$)O$_2$ | A 1.0% | 88.5 | A, 84 | C, — | — |
| Comparative example 2 | Li(Ni$_{0.5}$Co$_{0.2}$Mn$_{0.3}$)O$_2$ | P 1.5% | 86.4 | A, 92 | C, 137 | — |
| Comparative example 3 | Li(Ni$_{0.4}$Co$_{0.3}$Mn$_{0.3}$)O$_2$ | A 1.5% | 77.3 | B, 146 | — | — |

A: no change,
B: smoke generation,
C: fire,
D: explosion

INDUSTRIAL APPLICABILITY

A cathode active material for lithium secondary batteries according to the present invention comprises a lithium metal oxide core portion and an olivine-structured lithium iron phosphate oxide shell portion, and improves safety of the lithium secondary batteries, especially overcharge characteristics. And, a method for preparing a cathode active material for lithium secondary batteries according to the present invention has excellent reproducibility and productivity in preparing the core-shell type cathode active material of the present invention.

The invention claimed is:

1. A cathode active material for lithium secondary batteries, comprising:
    a lithium metal oxide secondary particle core portion formed by aggregation of lithium metal oxide primary particles; and
    a shell portion formed by coating the secondary particle core portion with an olivine-structured lithium iron phosphate oxide;
    wherein a weight ratio of the olivine-structured lithium iron phosphate oxide to the core portion is 0.5% to 1.5%,
    wherein the shell portion further includes a metal oxide of 1 to 100 nm size, and
    wherein a weight ratio between the olivine-structured lithium iron phosphate oxide and the metal oxide is in the range 1:1 to 5:1.

2. The cathode active material for lithium secondary batteries according to claim 1,
    wherein the lithium metal oxide is selected from the group consisting of LiCoO$_2$, Li(Ni$_a$Co$_b$Al$_c$)O$_2$, 0<a<1, 0<b<1, 0<c<1, a+b+c=1, Li(Ni$_d$—Co$_e$—Mn$_f$)O$_2$, 0<d<1, 0<e<1, 0<f<1, d+e+f=1, LiMn$_2$O$_4$, and mixtures thereof.

3. The cathode active material for lithium secondary batteries according to claim 1, wherein the secondary particle is spherical.

4. The cathode active material for lithium secondary batteries according to claim 1, wherein the secondary particle has an average particle diameter of 7 to 15 μm.

5. The cathode active material for lithium secondary batteries according to claim 1, wherein the olivine-structured lithium iron phosphate oxide has an average particle diameter of 1 μm or less.

6. The cathode active material for lithium secondary batteries according to claim 1, wherein the metal oxide is selected from the group consisting of an aluminum oxide, a titanium oxide, a yttrium oxide, a magnesium oxide, a zinc oxide, a lithium metal oxide, and mixtures thereof.

7. The cathode active material for lithium secondary batteries according to claim 6, wherein the lithium metal oxide of the shell portion is selected from the group consisting of a layered lithium composite metal oxide, a lithium cobalt oxide, a spinel-structured lithium manganese oxide, and mixtures thereof.

8. A cathode of lithium secondary batteries, comprising:
    a cathode collector; and
    a cathode active material layer formed on at least one surface of the cathode collector and including a cathode active material and a binder,
    wherein the cathode active material is defined in claim 1.

9. Lithium secondary batteries, each comprising:
    a cathode;
    an anode; and
    a separator interposed between the cathode and the anode,
    wherein the cathode is defined in claim 8.

10. A method of preparing a cathode active material for lithium secondary batteries according to claim 1, comprising:
    (S1) sintering a metal hydroxide and a lithium salt to form the lithium metal oxide secondary particle core portion, in which the lithium metal oxide primary particles are aggregated;
    (S2) dry-coating the core portion with the olivine-structured lithium iron phosphate oxide to form the shell portion outside of the core portion to form a resultant product; and
    (S3) heating the resultant product;
    wherein, in the step (S2), the shell portion is formed by dry-coating the core portion with a mixture of the olivine-structured lithium iron phosphate oxide and the metal oxide of 1 to 100 nm size.

11. The method of preparing a cathode active material for lithium secondary batteries according to claim 10, wherein, in the step (S1), the metal hydroxide is prepared by coprecipitation.

12. The method of preparing a cathode active material for lithium secondary batteries according to claim 10, wherein, in the step (S3), the heating is performed at 300 to 600° C. for 4 to 12 hours.

* * * * *